UNITED STATES PATENT OFFICE.

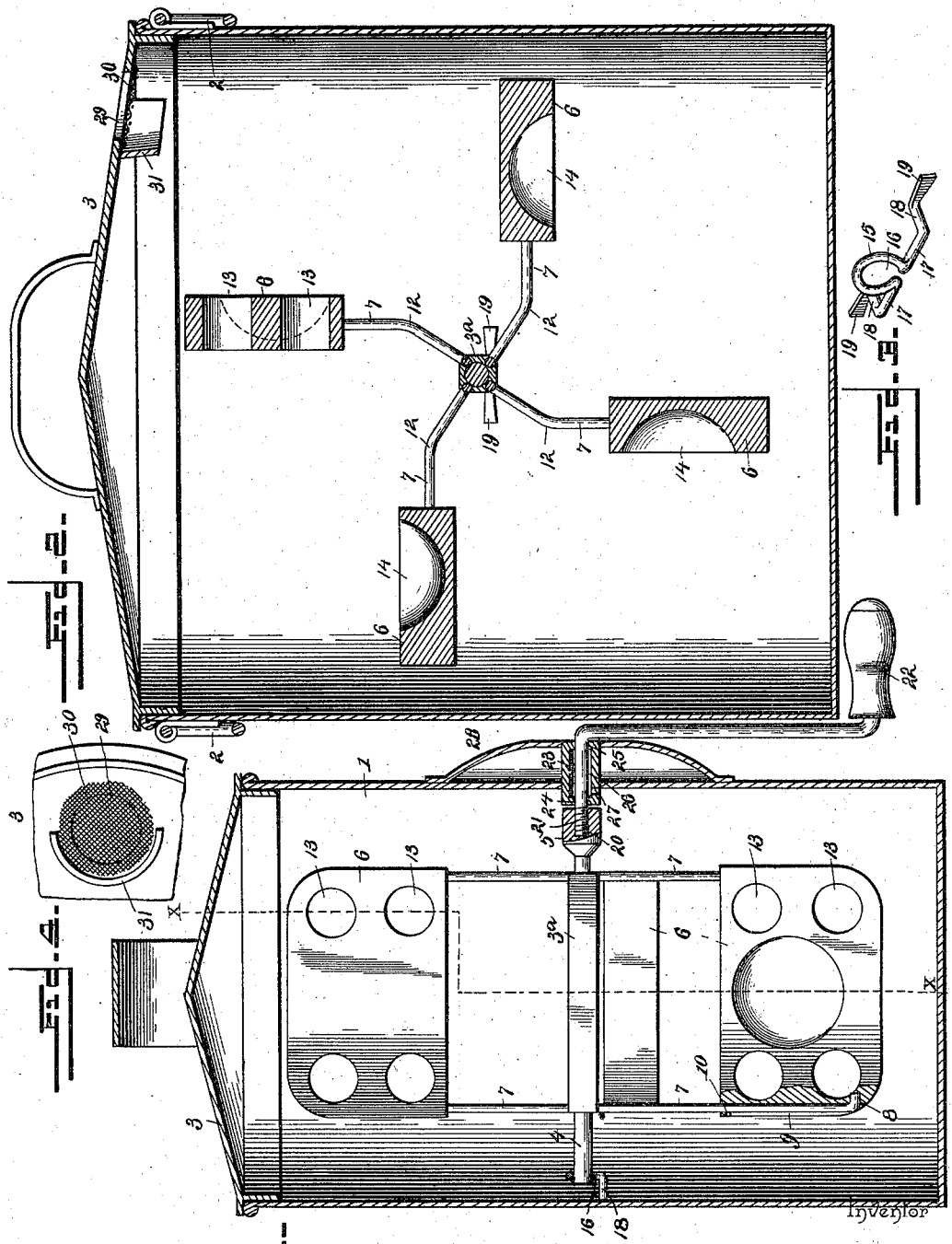

JOHN CHARLES McCALLEN, OF RUSSELLVILLE, KENTUCKY.

CHURN.

SPECIFICATION forming part of Letters Patent No. 573,993, dated December 29, 1896.

Application filed August 23, 1895. Serial No. 560,257. (No model.)

*To all whom it may concern:*

Be it known that I, JOHN CHARLES MCCALLEN, a citizen of the United States, residing at Russellville, in the county of Logan and State of Kentucky, have invented a new and useful Churn, of which the following is a specification.

My invention relates to churns, particularly to that class of churns in which a revolving dasher is employed; and the objects had in view are to produce a churn which is simple in construction, easily cleaned, not liable to get out of order, does not leak at the bearings, and contains improved means of agitating the milk and breaking the globules thereof.

With these and other objects in view my invention consists in the details of construction and combination of parts hereinafter specified, and more particularly pointed out in the claim.

In the drawings, Figure 1 is a vertical cross-section with the various parts in place. Fig. 2 is a longitudinal section taken on line $x\ x$ of Fig. 1. Fig. 3 is a detail view of the inner bearing. Fig. 4 is a bottom plan view of the air-vent and shield.

Referring to the details of construction by numerals, 1 designates the tank or receptacle for the milk and cream, which may be made of any desirable size and material and is ellipsoidal in horizontal cross-section, although this particular shape is not essential, but may be varied. Said tank is provided at either end with handles 2, and a flanged cover 3 is adapted to set into the top.

The dasher sets transversely across the tank 1 and rests in suitable bearings. Said dasher comprises a central shaft $3^a$, preferably of galvanized iron, prolonged and turned at one end 4 to form a bearing-shaft and provided at the opposite end with a screw-threaded socket 5 to receive the operating-handle, and also comprises radial blades 6, attached to said shaft $3^a$ by means of obtuse-angled strong wire rods 7. These rods are soldered or otherwise fastened to the shaft $3^a$, and at their opposite ends are bent and driven into the ends of blades 6, as at 8, each rod being countersunk in a groove 9, so as to be flush with the end of the blade and secured therein by a staple 10. Said rods are also upwardly bent intermediate their length, as at point 12, so that the blades 6 will strike with their full face flat against the cream, thereby striking with more force than if entering the cream slantwise and also attaining another object to be explained farther on. Radial blades 6 are made, preferably, of seasoned oak and are of sufficient size and weight to strike the liquid with considerable force. These blades are rectangular in shape, with rounded outer corners, although any other desirable shape may be employed. Opposite pairs of holes 13 are bored transversely through each blade to aid in breaking the milk globules, and in the center, between the two pairs of holes 13, a cup-like depression 14 is formed of considerable relative area as a further means of agitation of the milk, and also for the purpose of aeration, as further explained later on. The depressions 14 of all of the blades travel in the same circular path, so as to develop and maintain a distinct line of agitation independent of the lines of agitation produced by the pairs of holes or openings 13, and also providing for plunging the air into the milk between the opposite pairs of holes or openings 13.

The dasher-shaft $3^a$ is supported at end 4 in an improved internal bearing 15. This bearing is made of stiff wire circularly curved at 16, the depending ends bent laterally at 17 and again bent outwardly at 18 and provided with end flanges 19, which are soldered or otherwise secured at the center of the inner surface of one side of tank 1. Thus is provided a neat internal bearing, open to easy inspection, with no bottom bearing-surface to get clogged and sour by foul accumulations, standing out from the side, and of such shape and material as to be readily cleaned.

At the opposite end the dasher-shaft $3^a$ is provided with an internally-threaded socket 5, adapted to receive and to be supported by the correspondingly-threaded end 20 of shank 21 of the operating-handle 22. The latter is in turn supported in my improved journal-bearing 23. This bearing 23 is prolonged into a journal-box, as shown in Fig. 3, to present two bearing surfaces or rings 24 and 25, one at either end, adapted to closely embrace shank 21 and provided with an annular cavity 26 therebetween, which has a drip-hole 27 formed at its inner bottom end. A cup-shaped strengthening rib and support 28 retains the outer end 25 of bearing 23, while the side of tank 1 is perforated to receive and support the said bearing about midway of its length, so as to bring drip-hole 27 within the tank. By this arrangement I effectually provide against the annoying dripping of cream on the floor, which is so common at present. Whatever cream may work through between the shank 21 and bearing 24 is at once caught in the cavity 26 and drips back into the tank through the drip-hole 27.

In the cover 3, near one end, I provide air-vent 29, having a wire-gauze covering 30 and provided at its rear with a semicircular shield or protector 31, depending from the under side of the cover and tipping slightly forward to keep the cream from splashing out through the air-vent. This vent is for the purpose of giving a free circulation of air, which is maintained through the cream my means of the cups 14. As before explained, the blades strike with their full width flat against the surface of the cream, it being understood that for the most effective work the tank should be slightly less than half-full. This insures that each cup 14 will carry down its full quantity of air, which will be forced through the milk, creating an agitation additional to and different from that produced simply by the stirring of the revolving blades.

In operation the dasher is first properly fixed in the tank by inserting the journal end 4 of the shaft in its bearing 15 and adjusting the opposite end 5 in alinement with the bearing 23. The handle end 20 is then screwed tightly into the socket 5, and the churn is ready to receive the cream. This being poured in so as to fill the tank not quite half-full, the cover is put on and the dasher revolved. As blades 6 strike the cream the globules are separated by being forced through holes 13, as well as by the agitation caused by the plunging of the blades themselves, and a further separation is caused by the air being forced through the mass by means of the cups 14, fresh air being constantly supplied through the air-vent 29. This aeration not only shortens the time of butter-making, but improves the quality of the butter.

Having thus described my invention, what I claim is—

In a churn, a dasher comprising a horizontal shaft, a series of radially-disposed dasher-blades having flat sides, each separate blade being further provided therein with oppositely-located pairs of perforations or holes 13, a single central air cup or depression 14 formed in one side between the two pairs of perforations or holes 13, and grooves in its opposite end edges, the cups or depressions 14 of all of the blades traveling in the same circular path and a pair of obtuse-angled rods for each dasher-blade, said rods being secured at their inner ends to the shaft and having their outer ends fastened in the grooves in the ends of the blade and provided with angled extremities embedded in the body of the blade, substantially as set forth.

In testimony that I claim the foregoing as my own I have hereto affixed my signature in the presence of two witnesses.

JOHN CHARLES McCALLEN.

Witnesses:
  W. B. BROWDER,
  C. R. REID.